United States Patent
Liang et al.

(10) Patent No.: US 11,251,001 B2
(45) Date of Patent: Feb. 15, 2022

(54) KEYCAP, ILLUMINATING KEYSWITCH HAVING THE SAME AND METHOD FOR MANUFACTURING THE SAME

(71) Applicant: LITE-ON Technology (Chang Zhou) Co., LTD., Jiangsu Province (CN)

(72) Inventors: XiaoQiang Liang, Jiangsu Province (CN); Lei Shi, Jiangsu Province (CN); XueLei Liu, Jiangsu Province (CN)

(73) Assignee: Lite-On Technology (Chang Zhou) Co., Ltd., Jiangsu Province (CN)

( * ) Notice: Subject to any disclaimer, the term of this patent is extended or adjusted under 35 U.S.C. 154(b) by 0 days.

(21) Appl. No.: 16/547,985

(22) Filed: Aug. 22, 2019

(65) Prior Publication Data
US 2020/0098532 A1 Mar. 26, 2020

(30) Foreign Application Priority Data

Sep. 21, 2018 (CN) .......................... 201811105514.8

(51) Int. Cl.
*G01D 11/28* (2006.01)
*H01H 13/83* (2006.01)
(Continued)

(52) U.S. Cl.
CPC .......... *H01H 13/83* (2013.01); *G06F 3/0202* (2013.01); *H01H 3/12* (2013.01); *H01H 13/88* (2013.01); *H01H 2219/062* (2013.01)

(58) Field of Classification Search
CPC ............. H01H 13/83; H01H 2009/187; H01H 2209/016; H01H 2219/03; H01H 2221/07; H01H 2219/036; H01H 2219/056; H01H 2219/062; H01H 2229/016; H01H 2229/02; H01H 2229/044; H01H 2229/047; H01H 2219/054; H01H 2233/07; H01H 9/02; H01H 13/023; H01H 2219/0622;
(Continued)

(56) References Cited

U.S. PATENT DOCUMENTS

2003/0202337 A1* 10/2003 Yin ........................ H01H 13/70
362/23.03
2008/0202907 A1* 8/2008 Kyowski ................ H01H 13/83
200/310
(Continued)

*Primary Examiner* — Omar Rojas Cadima
(74) *Attorney, Agent, or Firm* — Umberg Zipser LLP; Ryan Dean (57) ABSTRACT

A keycap, an illuminating keyswitch and a method for manufacturing the same are provided. The illuminating keyswitch comprises a base plate, a printed circuit board, a light emitting element, a keycap and a lifting support structure. The printed circuit board is disposed on the base plate. The light emitting element electrically is connected to the printed circuit board. The keycap is disposed on the light emitting element. The lifting support structure is disposed between the base plate and the keycap. The keycap comprises a first injection layer and a second injection layer. The second injection layer covers the first injection layer. The light emitting element is configured to correspond to the first injection layer or the second injection layer. The keyswitch of the present invention covers the first injection layer through the second injection layer, so that the surface of the key cap is flat, thereby facilitating subsequent processing.

20 Claims, 6 Drawing Sheets

(51) Int. Cl.
*G06F 3/02* (2006.01)
*H01H 3/12* (2006.01)
*H01H 13/88* (2006.01)

(58) Field of Classification Search
CPC ....... H01H 2219/028; H01H 2229/014; H01H 2209/082; H01H 2219/00; H01H 2219/034; H01H 2223/038; H01H 2229/006; H01H 2229/046; H01H 13/704; H01H 2011/0081; F21V 3/062; B29K 2995/002; B29K 2995/0026; B32B 2310/0843; B32B 38/10; B29C 45/1418; B29C 2045/14245; C25D 5/56
See application file for complete search history.

(56) References Cited

U.S. PATENT DOCUMENTS

| | | | |
|---|---|---|---|
| 2010/0252407 A1* | 10/2010 | Merminod | H01H 13/83 200/5 A |
| 2011/0168532 A1* | 7/2011 | Tsai | H01H 13/83 200/314 |
| 2012/0145522 A1* | 6/2012 | Lee | G06F 3/0202 200/312 |
| 2016/0086746 A1* | 3/2016 | Chen | H01H 13/83 362/23.03 |
| 2018/0210486 A1* | 7/2018 | Choi | B29C 45/006 |

\* cited by examiner

KEYCAP, ILLUMINATING KEYSWITCH HAVING THE SAME AND METHOD FOR MANUFACTURING THE SAME

CROSS REFERENCE TO RELATED APPLICATION

This application claims the priority benefit of Chinese Patent Application Serial Number 201811105514.8, filed on Sep. 21, 2018, the full disclosure of which is incorporated herein by reference.

BACKGROUND

Technical Field

This present invention generally relates to the field of keyswitch and, more particularly, to a keycap, an illuminating keyswitch having the keycap, and a method for manufacturing the keycap.

Related Art

A keyboard is an important input device for electronic products. The development of the keyboard has a close relationship with the convenience of the user. An illuminating keyboard for use in a dim environment has gradually become the first choice for consumers.

At present, the keycap of the illuminating keyboard is manufactured by injection molding. The keycap usually has a first injection member and a second injection member, which are formed by first injection molding the first injection member, then injection molding the second injection member. The second injection member covering the first injection member, and the first injection member exposes from the second injection member. The surface of the first injection member and the surface of the second injection member are on the same plane. However, there is a gap between the first injection member and the second injection member, so that the surface of the keycap is not flat, which affects subsequent processing. For example, when the light shielding paint is sprayed on the first injection member and the second injection member, the light-shielding paint between the first injection member and the second injection member may have a texture. Finally, when the light-shielding paint on the first injection member is removed by laser, the edge and the grain do not completely match. Such a key cap may be classified as a defective product, resulting in an increase in the defective rate of illuminating keyswitches.

SUMMARY

The embodiments of the present invention provides a keycap, an illuminating having the keycap and a method for manufacturing the keycap to solve the problem that the surface of the key cap is uneven due to the manufacturing method.

In one embodiment, the present invention provides a keycap comprising a first injection layer and a second injection layer; wherein the second injection layer covers the first injection layer.

In one embodiment, the present invention provides an illuminating keyswitch, comprising a base plate; a printed circuit board disposed on the base plate; a light emitting element electrically connected to the printed circuit board; a keycap disposed on the light emitting element; wherein the keycap comprises a first injection layer and a second injection layer; the second injection layer covers the first injection layer; the light emitting element is configured to correspond to the first injection layer or the second injection layer; a light source emitted from the light emitting element emits from the first injection layer or the second injection layer.

In one embodiment, the present invention provides method for manufacturing the illuminating keyswitch, comprising: injection molding the first injection layer; and injection molding the second injection layer to cover the first injection layer.

In the embodiments of the present invention, the surface of the keycap is flattened by using the second injection layer to cover the first injection layer in the manufacturing process, thereby avoiding affecting subsequent processing and greatly improving the production yield of illuminating keyswitches.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals is used to refer to the same or similar elements throughout the invention.

Figure 1:
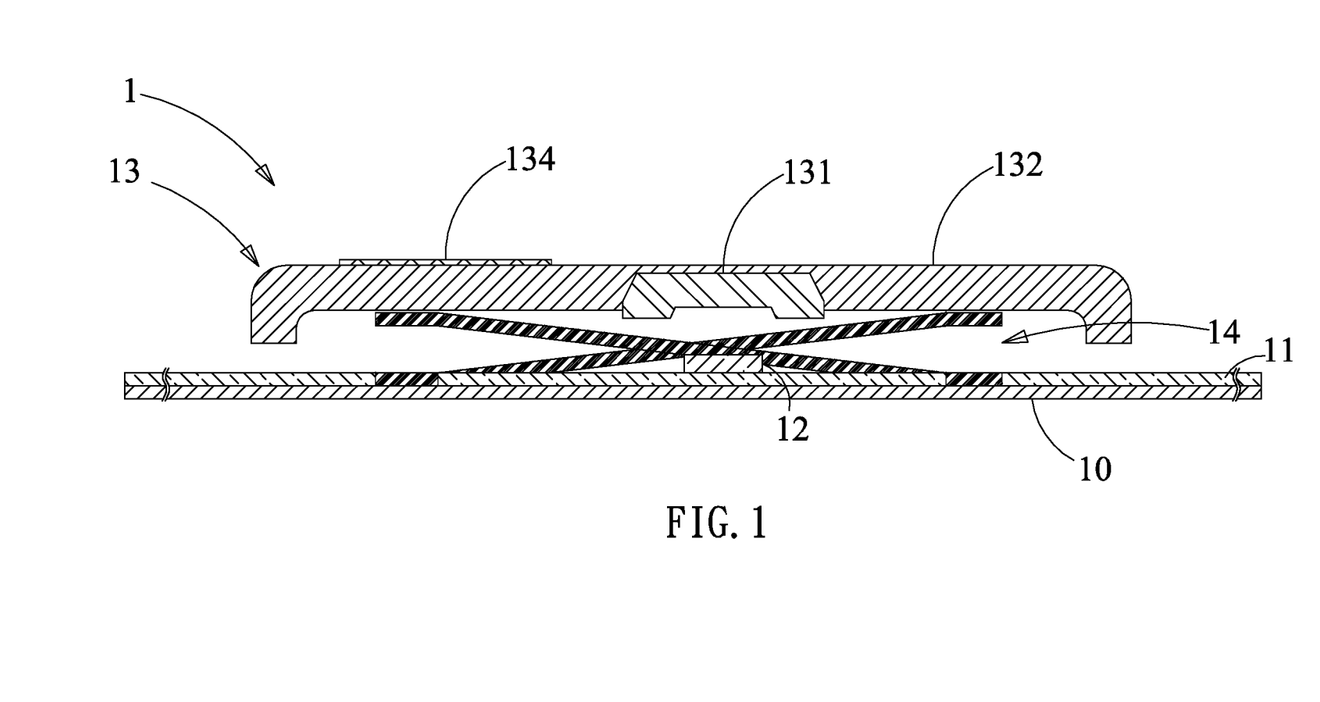
FIG. 1 is a schematic view of an illuminating keyswitch of a first embodiment of the present invention.

FIG. 1 is a schematic view of an illuminating keyswitch of a first embodiment of the present invention. As show in the figure, the illuminating keyswitch 1 of the first embodiment of the present invention includes a base plate 10, a printed circuit board 11, a light emitting element 12, and a keycap 13. The illuminating keyswitch 1 further comprises a lifting support structure 14, which is an example for illustration in this embodiment. Other similar support structures or different support structures may be applied in this embodiment. The printed circuit board 11 is disposed on the base plate 10. The light emitting element 12 is electrically connected to the printed circuit board 11. The keycap 13 is disposed on the light emitting element 12. The lifting support structure 14 disposed between the base plate 10 and the keycap 13. The keycap 13 moves up and down relative to the base plate 10 through the lifting support structure 14. The keycap 13 includes a first injection layer 131 and a second injection layer 132 covering the first injection layer 131. The first injection layer 131 is not exposed from the second injection layer 132, so that the surface of the keycap 13 is kept flat, and no uneven surface is generated to facilitate subsequent processing.

The method of manufacturing the keycap 13 of the illuminating keyswitch 1 of the present embodiment includes first injection molding the first injection layer 131 by injecting plastic into a first injection mold to form a first injection layer 131 in the first injection mold. The injection mold has a first molding space and the shape of the first molding space is the same as the shape of the first injection layer 131. Then, the second injection layer 132 is injection-molded to cover the first injection layer 131 by placing the first injection layer 131 in the second injection mold, and then injecting the plastic into the second injection mold to cover the first injection layer 131 to form the second injection layer 132. The second injection mold has a second molding space, the shape of which is the same as the shape of the keycap 13.

The first injection layer 131 and the second injection layer 132 of the embodiment are light transmissive layers, and the first injection layer 131 and the second injection layer 132 have different light transmittances. In the embodiment, the light transmittance of the first injection layer 131 is greater than the light transmittance of the second injection layer 132. The distance between the top surface of the second injection layer 132 and the top surface of the first injection layer 131 is between 0.1 mm and 10 mm. The top surface of the second injection layer 132 refers to the surface of the second injection layer 132 away from the first injection layer 131, and the top surface of the first injection layer 131 refers to the surface of the first injection layer 131 contacting the second injection layer 132. This distance refers to the thickness of the second injection layer 132 covering the first injection layer 131. When the second injection layer 132 is to be injected, the first injection layer 131 is disposed in the injection mold, and the distance between the surface of the first injection layer 131 and the top surface of the second molding space of the second injection mold is between 0.1 mm and 10 mm. The distance is determined according to the material, fluidity, viscosity, and temperature and pressure of the injection molding of the second injection layer 132, so that the second injection layer 132 can uniformly cover the first injection layer 131 when it is injected.

In this embodiment, the light emitting element 12 is disposed to correspond to the first injection layer 131 and located below the first injection layer 131. When the light emitting element 12 emits a light, the light is transmitted from the first injection layer 131 and the second injection layer 132. The second injection layer 132 of this embodiment further has a character pattern 134, such as an English letter, a number or other symbols. The character pattern 134 can be formed on the surface of the second injection layer 132 by printing or laser. In this embodiment, the lifting support structure 14 may be a crater structure, a column structure, a scissor foot structure or a butterfly foot structure. The light emitting element 12 may be a light-emitting diode. The printed circuit board 11, the lifting support structure 14 and the light-emitting element 12 are well-known technologies for those skilled in the art, and will not be described herein.

Figure 2:
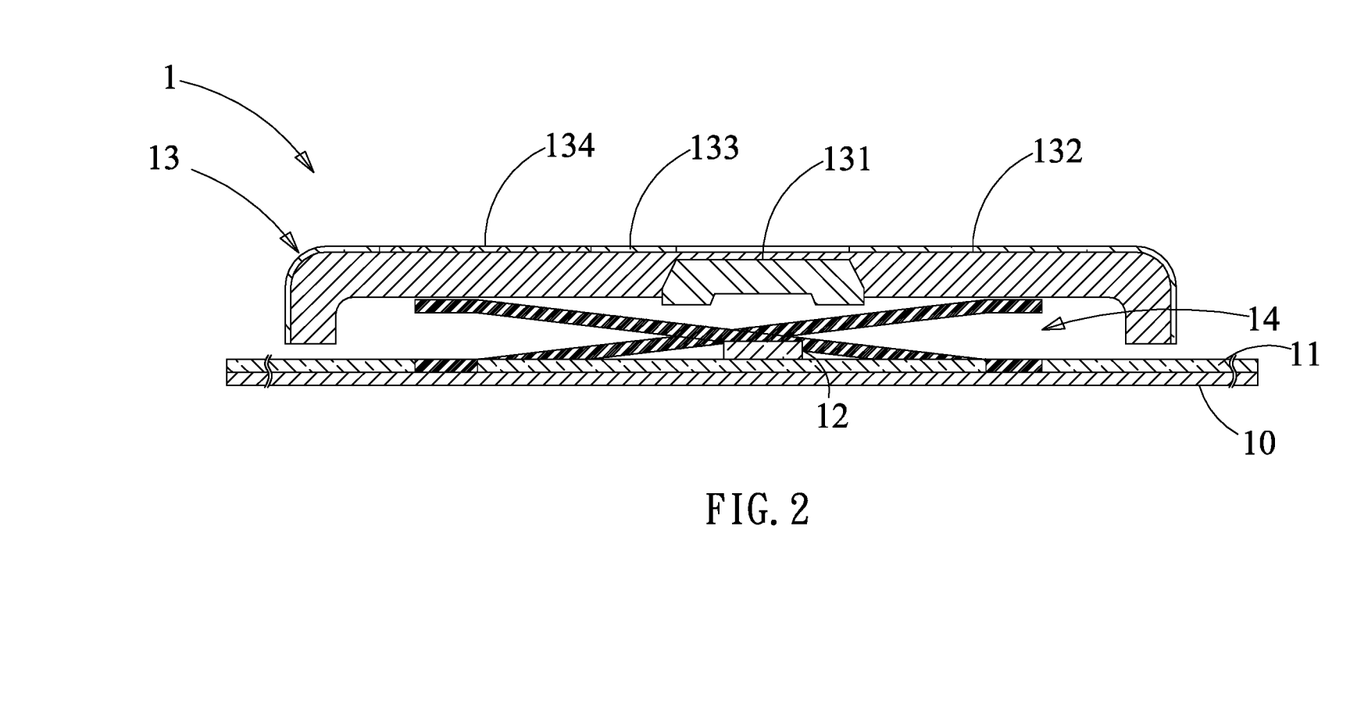
FIG. 2 is a schematic view of an illuminating keyswitch of a second embodiment of the present invention.

FIG. 2 is a schematic view of an illuminating keyswitch of a second embodiment of the present invention. As shown in the figure, the difference between the keyswitch 1 of the present embodiment and the illuminating keyswitch of the first embodiment lies in that the surface of the second injection layer 132 of the embodiment is further provided with a light shielding layer 133. The light shielding layer 133 can be formed on the surface of the second injection layer 132 by spraying or coating. The portion of the light shielding layer 133 corresponding to the first injection layer 131 is removed by laser to expose the first injection layer 131 and the second injection layer 132 corresponding to the first injection layer 131. That is, the light shielding layer 133 does not cover the first injection layer 131 and the second injection layer 132 on the first injection layer 131. The light shielding layer 133 of the present embodiment shields the light emitted from the second injection layer 132 not corresponding to the first injection layer 131 to enhance the light-emitting effect of the illuminating keyswitch 1. The character pattern 134 of the above embodiment is formed on the surface of the light shielding layer 133 by printing or laser. If the character pattern 134 is formed on the surface of the light shielding layer 133 by laser, the light emitted from the light emitting element 12 can be emitted from the character pattern 134.

Figure 3:
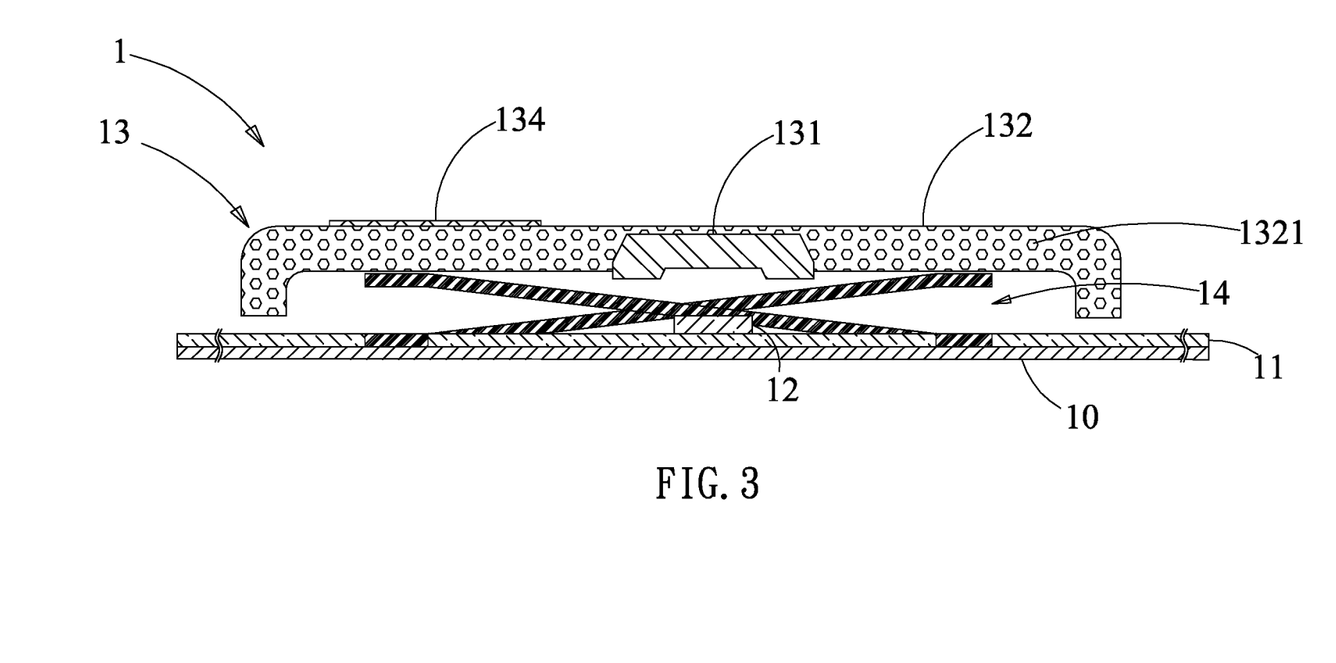
FIG. 3 is a schematic view of an illuminating keyswitch of a third embodiment of the present invention.

FIG. 3 is a schematic view of an illuminating keyswitch of a third embodiment of the present invention. As shown in the figure, the difference between the illuminating keyswitch 1 of the present embodiment and the illuminating keyswitch of the first embodiment lies in that the second injection layer 132 of the illuminating keyswitch 1 of the embodiment is a light transmissive layer including light scattering material 1321. The light scattering material 1321 may be Titanium dioxide. When the light emitted from the light emitting element 12 is to be emitted from the second injection layer 132, the light scattering material 1321 in the second injection layer 132 can disperse the light so that the light can be uniformly emitted from the second injection layer 132. Certainly, the first injection layer 131 of the embodiment may also be a light transmissive layer, which may also include the light scattering material, and thus the details are not described herein.

Figure 4:
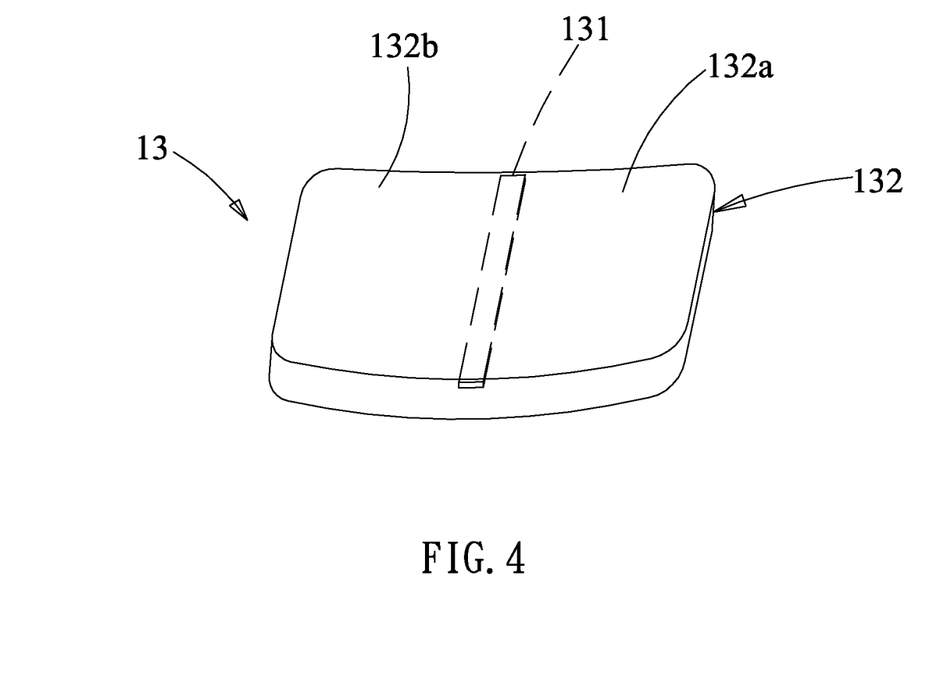
FIG. 4 is a perspective view of a keycap of a fourth embodiment of the present invention.
Figure 5:
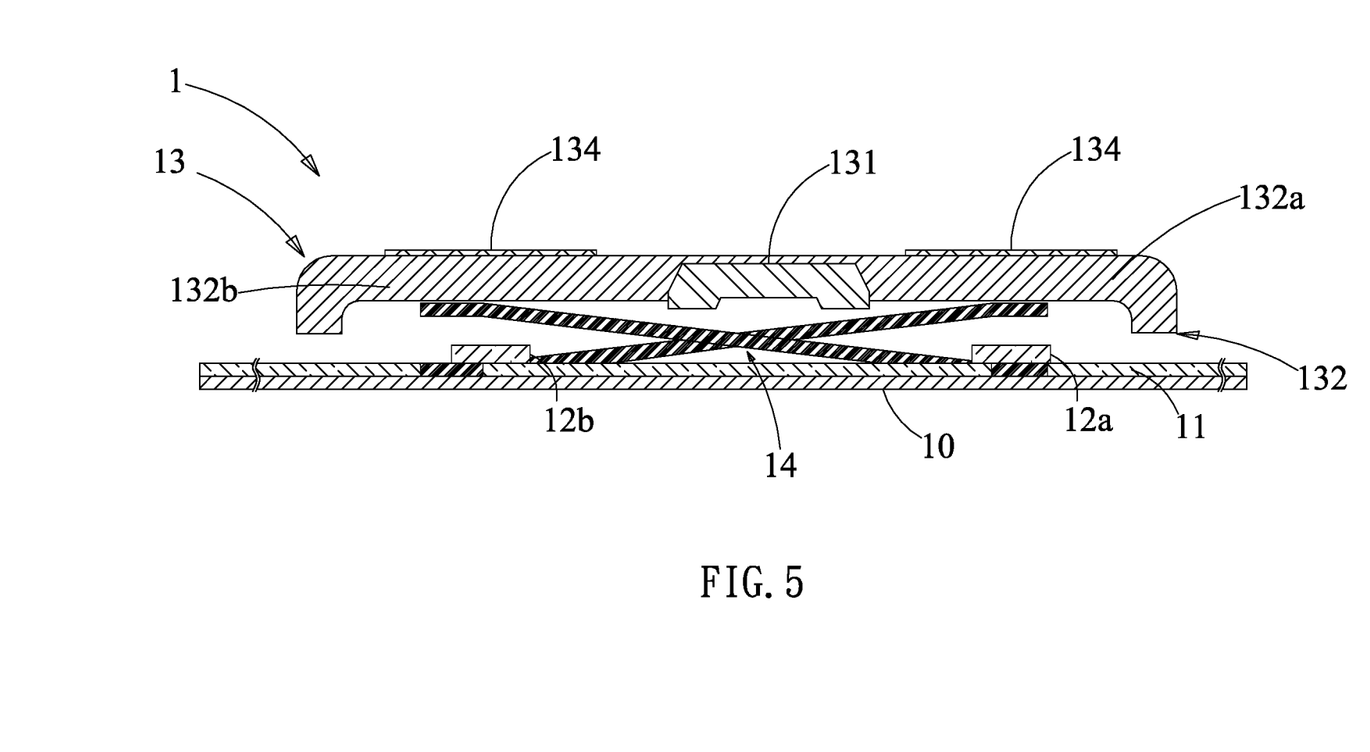
FIG. 5 is a schematic view of an illuminating keyswitch of the fourth embodiment of the present invention.

FIG. 4 is a perspective view of a keycap of a fourth embodiment of the present invention. FIG. 5 is a schematic view of an illuminating keyswitch of the fourth embodiment of the present invention. The difference between the illuminating keyswitch 1 of the present embodiment and the illuminating keyswitch of the first embodiment lies in that the cross-sectional shape of the first injection layer 131 of the above embodiment is circular, and the cross-sectional shape of the first injection layer 131 of the present embodiment is strip-shaped and opaque. That is the light transmittance of the first injection layer 131 is substantially zero. The light transmittance of the second injection layer 132 of the embodiment is greater than the light transmittance of the first injection layer 131. The first injection layer 131 separates the second injection layer 132 such that the second injection layer 132 has a first illuminating region 132a and a second illuminating region 132b. Therefore, the light emitting element of the present embodiment includes a first light emitting element 12a and a second light emitting element 12b. The first light emitting element 12a and the second light emitting element 12b are disposed on the printed circuit board 11 and respectively correspond to the first illuminating region 132a and the second illuminating region 132b. The first light emitting element 12a is located below the first illuminating region 132a, and the second light emitting element 12b is located below the second illuminating region 132b. The color of the light emitted from the first illuminating region 132a is determined according to the color of the light emitted by the first light emitting element 12a, and the light emitting color of the second illuminating region 132b is determined according to the color of the light emitted by the second light emitting element 12b. The color of the light emitted by the first light emitting element 12a is different from the color of the light emitted by the second light emitting element 12b. When the light of the first light emitting element 12a and the second light emitting element 12b are respectively emitted from the first light emitting area 132a and the second light emitting area 132b, the light-emitting color of the first illuminating region 132a is different from the light-emitting color of the second illuminating region 132b. For example, the color of the light of the first light emitting element 12a is red, and the color of the light of the second light emitting element 12b is yellow, and therefore, the light emitting color of the first illuminating region 132a corresponding to the first light-emitting element 12a is red, and the color of the second illuminating region 132b corresponding to the second light-emitting element 12b is yellow. The first injection layer 131 that is stripe and opaque can reduce the mutual interference between the colors of the first illuminating region 132a and the second illuminating region 132b, so that the illuminating keyswitch 1 of the embodiment is a two-color button.

Figure 6:
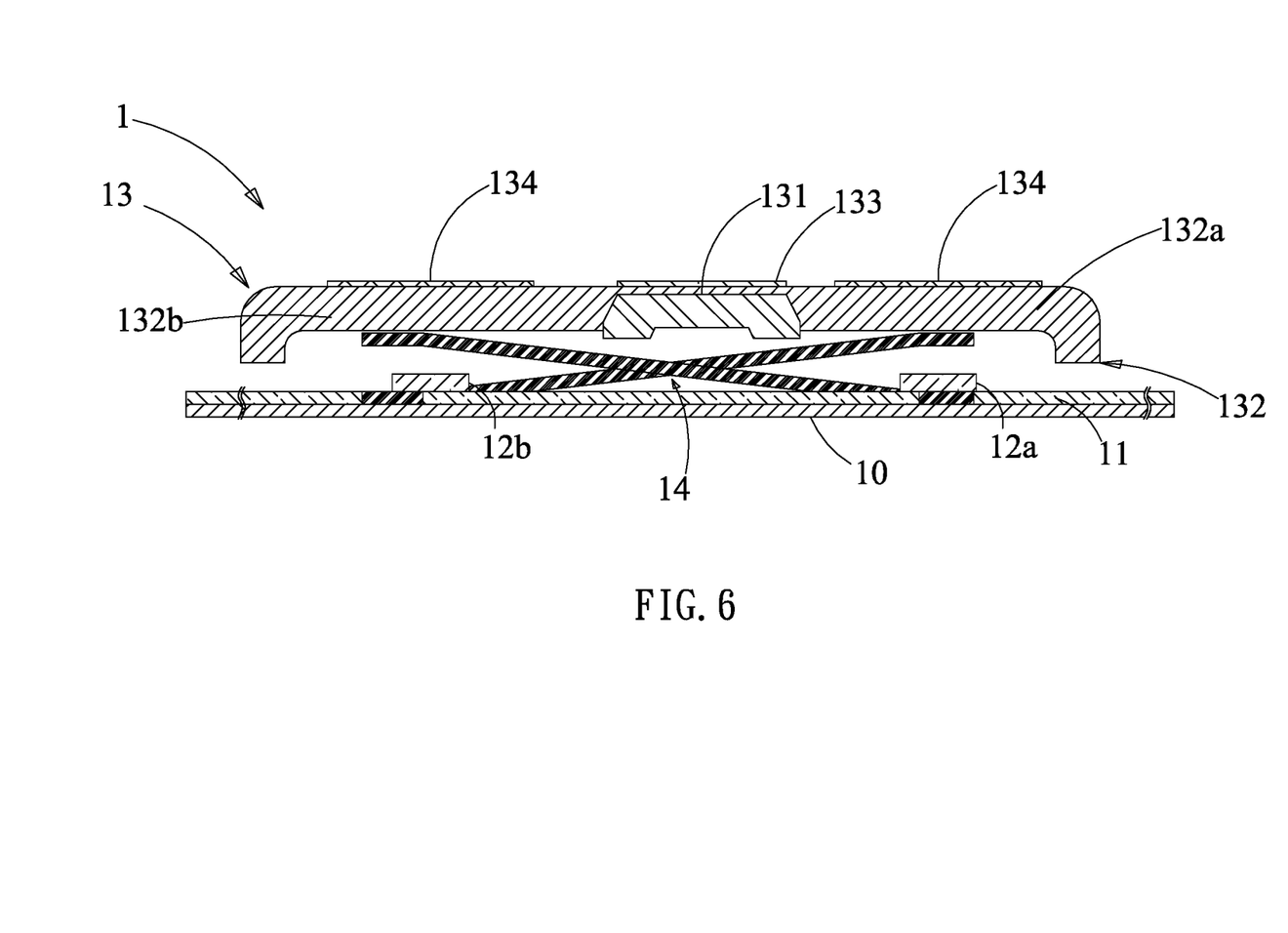
FIG. 6 is a schematic view of an illuminating keyswitch of a fifth embodiment of the present invention.

FIG. 6 is a schematic view of an illuminating keyswitch of a fifth embodiment of the present invention. As shown in the figure, the difference between the illuminating keyswitch 1 of the present embodiment and the illuminating keyswitch of the fourth embodiment lies in that the first injection layer 131 of this embodiment is a light transmissive layer. In order to prevent the light emitted by the first light emitting element 12a and the second light emitting element 12b from being emitted from the first injection layer 131, in this embodiment, the light shielding layer 133 is sprayed or coated on the surface of the second injection layer 132, and then the light shielding layer 133 corresponding to the first light emitting region 132a and the second light emitting region 132b is removed by laser method. The light shielding layer 133 corresponding to the first injection layer 131 is retained. The light shielding layer 133 can shield the light from the first injection layer 131 and the second injection layer 132 corresponding to the first injection layer 131 to prevent the light emitted from the first illuminating region 132a and the second illuminating region 132b from interfering with each other.

In the above embodiment, the first injection layer 131 divides the second injection layer 132 into two illuminating regions. Certainly, the first injection layer 131 can also divide the second injection layer 132 into two or more illuminating regions, and thus the details are not described herein.

The present invention further provides a keyboard device having a plurality of illuminating keyswitches, and the illuminating keyswitches can use the illuminating keyswitches of the above embodiments. The present invention also provides an electronic device having the keyboard device as described above.

In summary, the present invention provides a keycap, an illuminating keyswitch, having the keycap, and a method for manufacturing the keycap. The keycap of the illuminating keyswitch is completed by injection molding for twice. The first injection layer is formed at the first injection molding, and then the second injection layer is formed at the second injection molding, and the second injection layer covers the first injection layer. Thus, there is no gap between the first injection layer and the second injection layer. The surface of the keycap is flattened, so as to facilitate subsequent processing of the keycap, and the production yield of the illuminating keyswitch is greatly improved.

It is to be understood that the term "comprises", "comprising", or any other variants thereof, is intended to encompass a non-exclusive inclusion, such that a process, method, article, or device of a series of elements not only includes those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. An illuminating keyswitch, comprising:
   a base plate;
   a circuit board disposed on the base plate;
   a light emitting element electrically connected to the circuit board; and a keycap disposed on the light emitting element;
wherein the keycap comprises a first injection layer and a second injection layer; the first injection layer has a top surface, a bottom surface, and a side surface between the top surface and the bottom surface, wherein a width of the top surface of the first injection layer is smaller than a width of the bottom surface of the first injection layer; the second injection layer comprises a main body, and a peripheral sidewall extending downwardly from the main body and having a bottom edge facing the base plate; the light emitting element is configured to correspond to the first injection layer or the second injection layer; a light transmittance of the first injection layer is different from a light transmittance of the second injection layer;
wherein the bottom surface of the first injection layer comprises a first surface portion and a second surface portion, and the second surface portion located between the first surface portion and the main body of the second injection layer is protruded from an adjacent bottom surface of the second injection layer;
wherein the main body of the second injection layer covers the side surface of the first injection layer, and a distance between the base plate and the bottom surface of the first injection layer is greater than a distance between the base plate and the bottom edge of the peripheral sidewall.

2. The illuminating keyswitch according to claim 1, wherein the light emitting element is configured to correspond to the first injection layer; the light transmittance of the first injection layer is greater than the light transmittance of the second injection layer.

3. The illuminating keyswitch according to claim 2, wherein a light shielding layer is disposed on a surface of the second injection layer; the first injection layer and the second injection layer corresponding to the first injection layer are exposed from the light shielding layer.

4. The illuminating keyswitch according to claim 2, wherein the first injection layer or/and the second injection layer comprises light scattering material.

5. The illuminating keyswitch according to claim 1, wherein a character pattern is disposed on a side of the main body opposite to the bottom surface of the first injection layer.

6. The illuminating keyswitch according to claim 1, wherein the first injection layer separates the second injection layer; the second injection layer comprises a first illuminating region and a second illuminating region; the light emitting element comprises a first light emitting element and a second light emitting element; the first light emitting element is configured to correspond to the first illuminating region; the second light emitting element is configured to correspond to the second illuminating region.

7. The illuminating keyswitch according to claim 6, wherein the light transmittance of the first injection layer is substantially 0.

8. The illuminating keyswitch according to claim 6, wherein a light shielding layer is disposed at an area of the second injection layer corresponding to the first injection layer; the light shielding layer covers the first injection layer.

9. The illuminating keyswitch according to claim 6, wherein the illuminating color of the first illuminating region is determined according to a color of a light emitted from the first light emitting element; the illuminating color of the second illuminating region is determined according to a color of a light emitted from the second light emitting element; the color of the light emitted from the first light emitting element is different from the color of the light emitted from the second light emitting element; the illuminating color of the first illuminating region is different from the illuminating color of the second illuminating region.

10. The illuminating keyswitch according to claim 1, wherein a distance between a surface of the second injection layer away from the first injection layer and a surface of the first injection layer contacting the second injection layer is between 0.1 mm and 10 mm.

11. A method for manufacturing the illuminating keyswitch of claim 1, comprising:
injection molding the first injection layer; and
injection molding the second injection layer to cover the side surface the first injection layer.

12. The method according to claim 11, further comprising:
forming the light shielding layer on a surface of the second injection layer; and
removing a portion of the light shielding layer corresponding to the first injection layer to expose the first injection layer and the second injection layer corresponding to the first injection layer.

13. The method according to claim 11, further comprising:
forming the light shielding layer on a surface of the second injection layer, wherein the second injection layer comprising a first illuminating region and a second illuminating region; and
removing a portion of the light shielding layer corresponding to the first illuminating region and the second illuminating region.

14. The illuminating keyswitch according to claim 1, wherein the second surface portion is protruded from the first surface portion.

15. A keycap, comprising:
a first injection layer, having a top surface, a bottom surface, and a side surface between the top surface and the bottom surface; wherein a width of the top surface of the first injection layer is smaller than a width of the bottom surface of the first injection layer; and
a second injection layer, comprising a main body and a peripheral sidewall extending downwardly around the main body, wherein the main body cover the side surface of the first injection layer;
wherein the first injection layer comprises a protrusion part integrally extending from the side surface and connecting the bottom surface, and the protrusion part exposed by the second injection layer is protruded from a bottom surface of the main body corresponding to the first injection layer;
wherein a character pattern is disposed on a top surface of the main body, and not in contact with the first injection layer.

16. The keycap according to claim 15, wherein the light transmittance of the first injection layer is greater than the light transmittance of the second injection layer.

17. The keycap according to claim 15, wherein a light shielding layer is disposed on a surface of the second injection layer; the first injection layer and the second injection layer corresponding to the first injection layer are exposed from the light shielding layer.

18. The keycap according to claim 15, wherein the first injection layer separates the second injection layer; the light transmittance of the first injection layer is substantially 0.

19. The keycap according to claim 15, wherein a distance between a surface of the second injection layer away from the first injection layer and a surface of the first injection layer contacting the second injection layer is between 0.1 mm and 10 mm.

20. The keycap according to claim 15, wherein the bottom surface of the first injection layer has a recess toward the top surface, and a step is formed at a position corresponding to the protrusion part.

* * * * *